March 22, 1932.  W. E. KROTEE  1,850,210
INSULATED DRIVING CONNECTION
Filed Sept. 27, 1929
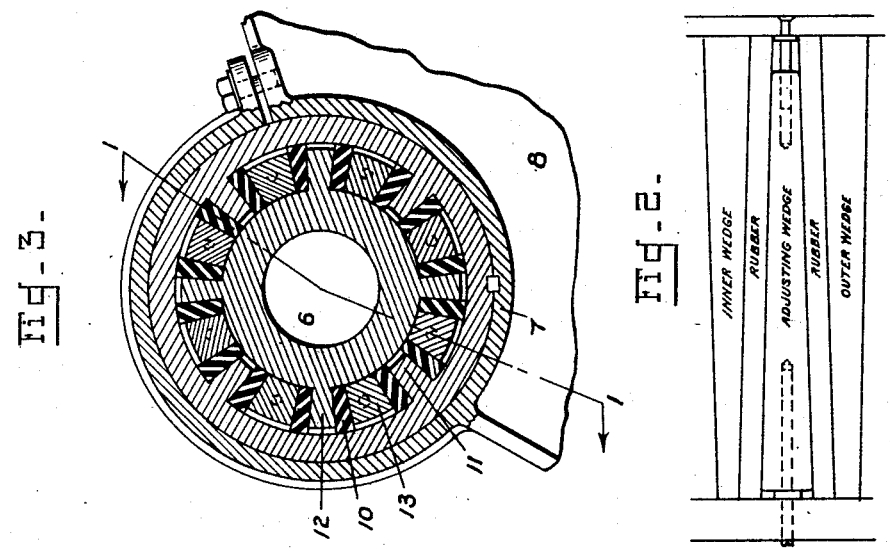
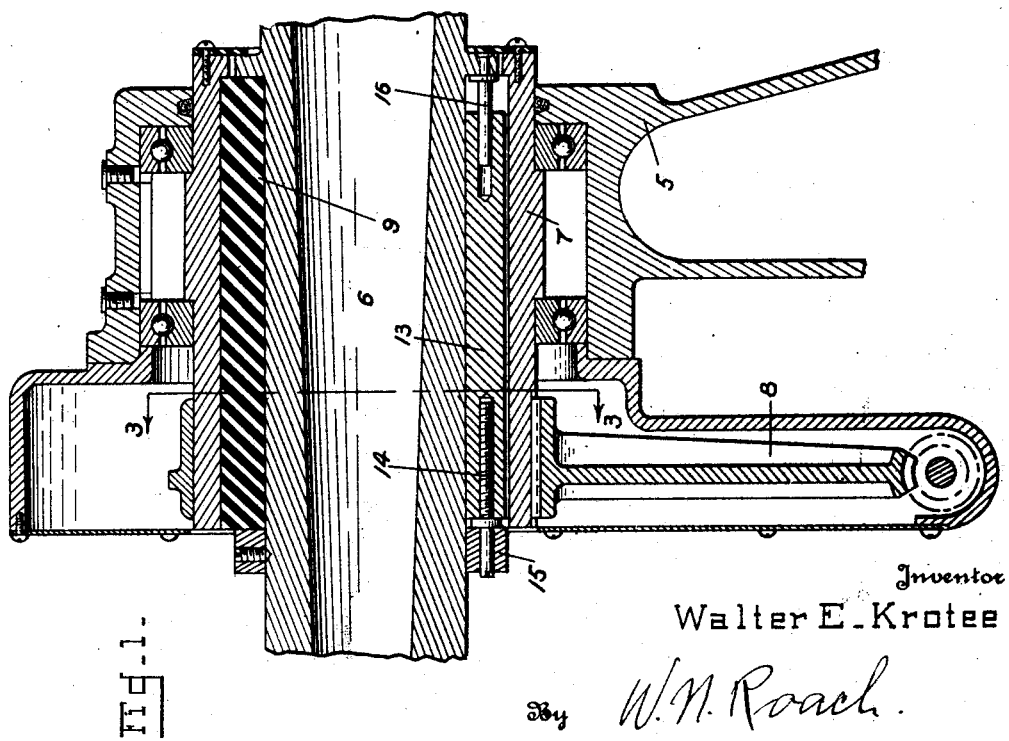
Inventor
Walter E. Krotee
By W. N. Roach.
Attorney Patented Mar. 22, 1932

1,850,210

UNITED STATES PATENT OFFICE

WALTER E. KROTEE, OF PHILADELPHIA, PENNSYLVANIA

INSULATED DRIVING CONNECTION

Application filed September 27, 1929. Serial No. 395,661.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to an insulated driving connection especially adapted for acoustic members.

The purpose of the present invention is to provide a novel arrangement of an insulated driving connection in which the insulation may be adjusted to compensate for shrinkage and its assembly facilitated.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a longitudinal sectional view on the line 1—1 of Fig. 3 of a bearing showing the improved insulated driving connection;

Fig. 2 is a diagrammatic plan view;

Fig. 3 is a sectional view on the line 3—3 of Fig. 1.

Referring to the drawings by numerals of reference:

There is shown a support 5 for mounting a member 6 which is to be driven through a sleeve 7 having a gear segment 8. The driven member 6 is inserted through the sleeve and is supported thereby through a bushing 9 of an insulating material.

For the purpose of establishing a driving connection between the member 6 of the sleeve, the bushing is made in sections 10—10 which are placed between alternately disposed, longitudinally extending fins 11 and 12, formed respectively on the inner wall of the sleeve and on the outer wall of the driven member 6. One or both of the fins are wedge-shaped in the direction of their length and are arranged to form a converging way for cooperation of a wedge 13 which separates a pair of the insulating sections 10 and holds them firmly against the fins.

The wedges 13, preferably rest on the driven member 6 and are each translated longitudinally thereof by means of a collar screw 14 threaded in one end of the wedge and bearing against a fixed seat 15 on the driven member. The other end of the wedge is supported and guided by a rod 16 carried by the driven member.

The driving connection thus established consists of elements which may be readily assembled without precise dimensioning and which may be adjusted to remove all looseness. The insulation will effectively damp out any sound vibrations arising from the actuating parts of the driving mechanism.

I claim:

1. A bearing including a support, a sleeve mounted in the support and provided internally with longitudinally extending fins, a member within the sleeve provided externally with longitudinally extendings fins, the fins on the sleeve and member being alternately disposed and forming a converging way, a pair of insulating members between adjacent fins, a longitudinally movable wedge separating the insulating members and means for driving the sleeve.

2. A bearing including a support, a driving member mounted on the support, a driven member within the driving member and spaced therefrom, means on the adjacent walls of the members cooperating to form wedge-ways, insulating material in the wedge-ways and a longitudinally movable wedge separating the insulating material.

WALTER E. KROTEE.